US012627911B2

(12) United States Patent
Zhang et al.

(10) Patent No.: US 12,627,911 B2
(45) Date of Patent: May 12, 2026

(54) TRANSMISSION METHOD, APPARATUS, AND SYSTEM

(71) Applicant: Huawei Technologies Co., Ltd., Shenzhen (CN)

(72) Inventors: Lun Zhang, Dongguan (CN); Gang Zheng, Dongguan (CN)

(73) Assignee: Huawei Technologies Co., Ltd., Shenzen (CN)

( * ) Notice: Subject to any disclaimer, the term of this patent is extended or adjusted under 35 U.S.C. 154(b) by 251 days.

(21) Appl. No.: 18/489,433

(22) Filed: Oct. 18, 2023

(65) Prior Publication Data

US 2024/0048880 A1     Feb. 8, 2024

Related U.S. Application Data

(63) Continuation of application No. PCT/CN2022/079519, filed on Mar. 7, 2022.

(30) Foreign Application Priority Data

Apr. 19, 2021     (CN) .......................... 202110419412.9

(51) Int. Cl.
*H04Q 11/00* (2006.01)
(52) U.S. Cl.
CPC .................. *H04Q 11/0067* (2013.01); *H04Q 2011/0064* (2013.01)
(58) Field of Classification Search
CPC .................................................. H04Q 11/0067
See application file for complete search history.

(56) References Cited

U.S. PATENT DOCUMENTS

2010/0215369 A1* 8/2010 Effenberger ....... H04Q 11/0067
398/67
2014/0186039 A1* 7/2014 Luo .................... H04Q 11/0067
398/66
2021/0099231 A1* 4/2021 Schaefer ................ H04B 10/27

FOREIGN PATENT DOCUMENTS

CN        112584262 A    3/2021
CN        113328824 A    8/2021
EP          3367592 A1    8/2018
EP          4231660 A1    8/2023

OTHER PUBLICATIONS

Wikipedia, "EtherCAT", URL:https://en.wikipedia.org/wiki/Main_Page, May 26, 2006, total 9 pages.

* cited by examiner

*Primary Examiner* — Shi K Li
(74) *Attorney, Agent, or Firm* — Slater Matsil, LLP

(57)     ABSTRACT

In accordance with an embodiment, an optical head end generates uplink grant information of periodic data based on configuration information of the periodic data from a controller, where the uplink grant information of the periodic data is continuously valid within a threshold time range, and indicates a corresponding transmission slot of sending the periodic data by an optical terminal. The optical head end sends the uplink grant information of the periodic data to the optical terminal.

20 Claims, 8 Drawing Sheets

Optical terminal

Optical terminal

Optical head end

Optical terminal

Optical terminal

TRANSMISSION METHOD, APPARATUS, AND SYSTEM

CROSS-REFERENCE TO RELATED APPLICATIONS

This application is a continuation of International Application No. PCT/CN2022/079519, filed on Mar. 7, 2022, which claims priority to Chinese Patent Application No. 202110419412.9, filed on Apr. 19, 2021. The disclosures of the aforementioned applications are hereby incorporated by reference in their entireties.

TECHNICAL FIELD

This application relates to the field of communication technologies, and in particular, to a transmission method, apparatus, and system.

BACKGROUND

With rapid development of science and technology, there are higher requirements on stability and costs of communication between devices. Therefore, a field bus is emerging. A plurality of control devices may be mounted on a pair of twisted pairs of a field bus. This provides a user with more flexible initiative in system integration, effectively resolves problems of digital communication between field devices such as intelligent instruments, controllers, and actuators in the industrial field, and information transmission between these field control devices and advanced control systems, and improves system reliability.

However, existing field bus networks all have operating cycles at a millisecond (ms) level, which cannot meet a higher level requirement for a lower delay in future industrial manufacturing. Therefore, how to implement communication with a lower delay in the field bus network is a technical problem to be resolved urgently.

SUMMARY

Some embodiments disclosed in the application provide a transmission method, apparatus, and system, to reduce a delay and a delay jitter in a process of transmitting downlink service data.

To support an industrial control service scenario that requires a low delay or a high bandwidth, in a possible implementation, it is considered that a passive optical network (PON) is introduced into the industrial control field.

In an optional implementation of embodiments of this application, a PON system may include a controller, an optical head end, and at least one optical terminal.

In an optional implementation of embodiments of this application, the optical head end may be an OLT. In other words, the OLT can implement a function of the optical head end.

In an optional implementation of embodiments of this application, the optical terminal may be an ONU, and/or may be an ONT. In other words, the ONT or the ONU can implement a function of the optical terminal.

It should be noted that the optical head end and the controller may be deployed separately, or may be deployed in an integrated manner. In other words, the optical head end and the controller may be deployed on different physical devices, or may be deployed on a same physical device. In other words, the optical head end and the controller may be two independent physical devices, or may be two functional modules in a same physical device. In addition, the optical terminal and the secondary station may be deployed separately, or may be deployed in an integrated manner. In other words, the optical terminal and the secondary station are independent and different physical devices, or the optical terminal and the secondary station may be integrated devices. This is not limited in this application.

Herein, the PON system in this embodiment of this application may be, for example, a gigabit-capable passive optical network (gigabit-capable PON, GPON) system or an Ethernet passive optical network (Ethernet PON, EPON) system, a 10 gigabit Ethernet passive optical network (10G-EPON) system, a time division and wavelength division multiplexing passive optical network (TWDM-PON) system, a 10-gigabit-capable passive optical network (XG-PON) system, or a 10-gigabit-capable symmetric passive optical network (XGS-PON) system. With emergence of a new technology that evolves in the future, a rate of the PON system may be increased to 25 Gbps, 50 Gbps, or even 100 Gbps. Therefore, the optical communication system may alternatively be a PON system with a higher transmission rate. This is not limited in this application.

In a possible implementation, the foregoing PON system may be a PON system that supports a single wavelength.

Optionally, the PON system may further include a field control device. The field control device is, for example, a transmission device (such as a servo driver and a servo motor), a sensing device (such as a sensor), or an input/output (I/O) device. It should be understood that these field control devices may be collectively referred to as secondary stations.

In a first aspect, this application provides a communication method. The method may be applied to an optical bus network. The optical bus network includes an optical head end, a controller, and at least one optical terminal. The method includes:

The optical head end generates uplink grant information of periodic data based on configuration information of the periodic data from the controller, where the uplink grant information of the periodic data indicates a corresponding transmission slot of sending the periodic data by the optical terminal, and the uplink grant information of the periodic data is continuously valid within a threshold time range. The optical head end sends the uplink grant information of the periodic data to the optical terminal.

For example, the optical head end may be, for example, an OLT. The optical terminal may be an ONU, and/or may be an optical network terminal (ONT).

Based on the foregoing solutions, the uplink grant information of the periodic data sent by the optical head end to the optical terminal is continuously valid within the threshold time range. Therefore, the optical head end may no longer deliver the uplink grant information of the periodic data to the optical terminal within the threshold time range. For example, the optical head end no longer delivers a bandwidth map (BWMAP) of the periodic data to the optical terminal in a cycle period. This can effectively avoid waiting time for sending downlink service data and reduce a delay.

In a possible implementation, the uplink grant information of the periodic data is continuously valid before the optical head end reconfigures the uplink grant information of the periodic data.

In a possible implementation, the optical head end sends the uplink grant information of the periodic data to the optical terminal in a pre-configuration phase.

Based on the foregoing solutions, the optical head end sends the uplink grant information of the periodic data to the optical terminal in the pre-configuration phase, so that the optical head end does not need to send the uplink grant information of the periodic data to the optical terminal in a transmission phase. This can effectively avoid waiting time for sending downlink service data and reduce a delay.

In a possible implementation, the uplink grant information of the periodic data is carried in an administration and maintenance message in a frame structure sent by the optical head end to the optical terminal.

Based on the foregoing solution, the optical head end includes the uplink grant information of the periodic data to the administration and maintenance message in the frame structure, and sends the management and maintenance message to the optical terminal. Because there is no need to carry the uplink grant information of the periodic data in the BWMAP information in the frame structure for sending, a size of a BWMAP field of a downlink frame header can be effectively reduced. This can effectively avoid waiting time for sending downlink service data and reduce a delay.

In a possible implementation, the uplink grant information of the periodic data is carried in a physical layer operations, administration and maintenance downstream (PLOAMd) message in the frame structure sent by the optical head end to the optical terminal. The PLOAMd message includes a correspondence between an optical terminal identifier and a periodic data transmission slot. Alternatively, the uplink grant information of the periodic data is carried in an ONT management and control interface (OMCI) message in the frame structure sent by the optical head end to the optical terminal. The OMCI message includes a correspondence between an optical terminal identifier and a periodic data transmission slot.

Based on the foregoing solutions, this embodiment of this application provides a plurality of manners of sending the uplink grant information of the periodic data. For example, the optical head end may carry the uplink grant information of the periodic data in the PLOAMd message in the frame structure. Alternatively, the optical head end may carry the uplink grant information of the periodic data in the OMCI message in the frame structure.

In a possible implementation, the method further includes: The optical head end determines uplink grant information of aperiodic data after receiving an aperiodic data request from the controller, where the uplink grant information of the aperiodic data indicates a corresponding transmission slot of sending the aperiodic data by the optical terminal. The optical head end sends the aperiodic data request and the uplink grant information of the aperiodic data to the optical terminal.

Based on the foregoing solutions, this embodiment of this application provides an uplink grant manner for aperiodic data.

In a possible implementation, the transmission slot corresponding to the aperiodic data is the remaining slot other than the transmission slot corresponding to the periodic data.

In a possible implementation, the uplink grant information of the aperiodic data is carried in the BWMAP message in the frame structure sent by the optical head end to the optical terminal.

In a possible implementation, the uplink grant information of the periodic data includes: at least one information group. Each optical terminal corresponds to at least one information group, and each information group includes an allocation number Allocid, a start time starttime, and a grant size grantsize.

In a second aspect, this application provides a communication method. The method may be applied to an optical bus network. The optical bus network includes an optical head end, a controller, and at least one optical terminal. The method includes:

The optical terminal collects periodic data corresponding to a secondary station after receiving a periodic data request from the optical head end. The optical terminal determines, based on received uplink grant information of the periodic data from the optical head end, a corresponding transmission slot of sending the periodic data, where the uplink grant information of the periodic data is continuously valid within a threshold time range. The optical terminal sends the periodic data to the optical head end based on the transmission slot corresponding to the periodic data.

For example, the optical head end may be, for example, an OLT. The optical terminal may be an ONU, and/or may be an ONT.

Based on the foregoing solutions, the uplink grant information of the periodic data sent by the optical head end to the optical terminal is continuously valid within the threshold time range. Therefore, the optical head end may no longer deliver the uplink grant information of the periodic data to the optical terminal within the threshold time range. For example, the optical head end no longer delivers a bandwidth map (BWMAP) of the periodic data to the optical terminal in a cycle period. This can effectively avoid waiting time for sending downlink service data and reduce a delay.

In a possible implementation, the uplink grant information of the periodic data is continuously valid before the optical head end reconfigures the uplink grant information of the periodic data.

In a possible implementation, the grant information of the periodic data is received by the optical terminal from the optical head end in a pre-configuration phase.

Based on the foregoing solutions, the optical head end sends the uplink grant information of the periodic data to the optical terminal in the pre-configuration phase, so that the optical head end does not need to send the uplink grant information of the periodic data to the optical terminal in a transmission phase. This can effectively avoid waiting time for sending downlink service data and reduce a delay.

In a possible implementation, the grant information of the periodic data is received by the optical terminal from the optical head end in a pre-configuration phase.

In a possible implementation, the uplink grant information of the periodic data is carried in an administration and maintenance message in a frame structure sent by the optical head end to the optical terminal.

Based on the foregoing solution, the optical head end includes the uplink grant information of the periodic data to the administration and maintenance message in the frame structure, and sends the management and maintenance message to the optical terminal. Because there is no need to carry the uplink grant information of the periodic data in the BWMAP information in the frame structure for sending, a size of a BWMAP field of a downlink frame header can be effectively reduced. This can effectively avoid waiting time for sending downlink service data and reduce a delay.

In a possible implementation, the uplink grant information of the periodic data is carried in a PLOAMd message in the frame structure sent by the optical head end to the optical terminal. The PLOAMd message includes a correspondence between an optical terminal identifier and a periodic data transmission slot. Alternatively, the uplink grant information of the periodic data is carried in an OMCI message in the frame structure sent by the optical head end to the optical terminal. The OMCI message includes a correspondence between an optical terminal identifier and a periodic data transmission slot.

Based on the foregoing solutions, this embodiment of this application provides a plurality of manners of sending the uplink grant information of the periodic data. For example, the optical head end may carry the uplink grant information of the periodic data in the PLOAMd message in the frame structure. Alternatively, the optical head end may carry the uplink grant information of the periodic data in the OMCI message in the frame structure.

In a possible implementation, the method further includes: The optical terminal receives an aperiodic data request and uplink grant information of aperiodic data from the optical head end, where the uplink grant information of the aperiodic data indicates a corresponding transmission slot of sending the aperiodic data by the optical terminal. The optical terminal sends the aperiodic data to the optical head end based on the transmission slot corresponding to the aperiodic data.

Based on the foregoing solutions, this embodiment of this application provides an uplink grant manner for aperiodic data.

In a possible implementation, the transmission slot corresponding to the aperiodic data is the remaining slot other than the transmission slot corresponding to the periodic data.

In a possible implementation, the uplink grant information of the periodic data includes: at least one information group, where each optical terminal corresponds to at least one information group, and each information group includes Allocid, starttime, and grantsize.

In a third aspect, this application provides a transmission apparatus. The transmission apparatus has a function of implementing an optical line terminal in the first aspect, or is configured to implement a function of an optical network unit in the second aspect. This function may be implemented by using hardware, or may be implemented by executing corresponding software by hardware. The hardware or the software includes one or more units or modules corresponding to the foregoing functions.

In a possible implementation, the communications apparatus may be an optical line terminal, or a module that may be used in the optical line terminal, for example, a chip, a chip system, or a circuit. For beneficial effects, refer to descriptions of the first aspect. Details are not described here again. The transmission apparatus may include: a transceiver and a processor. The processor may be configured to support the transmission apparatus to perform a corresponding function of the foregoing optical line terminal. The transceiver is configured to support communication between the transmission apparatus and the optical network unit, a controller PLC, or the like. The transceiver may be an independent receiver, an independent transmitter, a transceiver integrated with a transceiver function, or an interface circuit. Optionally, the transmission apparatus may further include a memory. The memory may be coupled to the processor, and the memory stores necessary program instructions and data of the transmission apparatus.

The transceiver is configured to generate uplink grant information of periodic data based on configuration information of the periodic data from the controller. The uplink grant information of the periodic data indicates a corresponding transmission slot of sending the periodic data by the optical terminal. The uplink grant information of the periodic data is continuously valid within a threshold time range. The uplink grant information of the periodic data is sent to the optical terminal.

In a possible implementation, the uplink grant information of the periodic data is continuously valid before the optical head end reconfigures the uplink grant information of the periodic data.

In a possible implementation, the transceiver is specifically configured to:

in a pre-configuration phase, send the uplink grant information of the periodic data to the optical terminal.

In a possible implementation, the uplink grant information of the periodic data is carried in an administration and maintenance message in a frame structure sent by the optical head end to the optical terminal.

In a possible implementation, the uplink grant information of the periodic data is carried in a PLOAMd message in the frame structure sent by the optical head end to the optical terminal. The PLOAMd message includes a correspondence between an optical terminal identifier and a periodic data transmission slot. Alternatively, the uplink grant information of the periodic data is carried in an OMCI message in the frame structure sent by the optical head end to the optical terminal. The OMCI message includes a correspondence between an optical terminal identifier and a periodic data transmission slot.

In a possible implementation, the transceiver is further configured to:

receive an aperiodic data request from the controller.

The processor is further configured to:

determine uplink grant information of the aperiodic data. The uplink grant information of the aperiodic data indicates a corresponding transmission slot of sending the aperiodic data by the optical terminal.

The transceiver is further configured to:

send the aperiodic data request and the uplink grant information of the aperiodic data to the optical terminal.

In a possible implementation, the transmission slot corresponding to the aperiodic data is the remaining slot other than the transmission slot corresponding to the periodic data.

In a possible implementation, the uplink grant information of the periodic data includes: at least one information group, where each optical terminal corresponds to at least one information group, and each information group includes Allocid, start-time, and grantsize.

In another possible implementation, the transmission apparatus may be an optical network unit, or a component that can be used in the optical network unit, for example, a chip, a chip system, or a circuit. For beneficial effects, refer to descriptions of the second aspect. Details are not described here again. The transmission apparatus may include: a transceiver and a processor. The processor may be configured to support the transmission apparatus to perform a corresponding function of the foregoing optical network unit. The transceiver is configured to support communication between the transmission apparatus and the optical line terminal, or the like. The transceiver may be an independent receiver, an independent transmitter, a transceiver integrated with a transceiver function, or an interface circuit. Optionally, the transmission apparatus may further include a memory. The memory may be coupled to the processor, and the memory stores necessary program instructions and data of the transmission apparatus.

The transceiver is configured to collect periodic data corresponding to a secondary station after receiving a periodic data request from the optical head end. A corresponding transmission slot of sending the periodic data is determined based on received uplink grant information of the periodic data from the optical head end. The uplink grant information of the periodic data is continuously valid within a threshold time range. The periodic data is sent to the optical head end based on the transmission slot corresponding to the periodic data.

In a possible implementation, the uplink grant information of the periodic data is continuously valid before the optical head end reconfigures the uplink grant information of the periodic data.

In a possible implementation, the grant information of the periodic data is received by the optical terminal from the optical head end in a pre-configuration phase.

In a possible implementation, the grant information of the periodic data is received by the optical terminal from the optical head end in a pre-configuration phase.

In a possible implementation, the uplink grant information of the periodic data is carried in an administration and maintenance message in a frame structure sent by the optical head end to the optical terminal.

In a possible implementation, the uplink grant information of the periodic data is carried in a PLOAMd message in the frame structure sent by the optical head end to the optical terminal. The PLOAMd message includes a correspondence between an optical terminal identifier and a periodic data transmission slot. Alternatively, the uplink grant information of the periodic data is carried in an OMCI message in the frame structure sent by the optical head end to the optical terminal. The OMCI message includes a correspondence between an optical terminal identifier and a periodic data transmission slot.

In a possible implementation, the transceiver is further configured to:

receive an aperiodic data request and uplink grant information of aperiodic data from the optical head end. The uplink grant information of the aperiodic data indicates a corresponding transmission slot of sending the aperiodic data by the optical terminal; and send the aperiodic data to the optical head end based on the transmission slot corresponding to the periodic data.

In a possible implementation, the transmission slot corresponding to the aperiodic data is the remaining slot other than the transmission slot corresponding to the periodic data.

In a possible implementation, the uplink grant information of the periodic data includes: at least one information group, where each optical terminal corresponds to at least one information group, and each information group includes Allocid, starttime, and grantsize.

In a fourth aspect, this application provides a transmission apparatus. The transmission apparatus is configured to implement the foregoing first aspect or any method in the first aspect, or is configured to implement the foregoing second aspect or any method in the second aspect, and includes corresponding function modules, respectively configured to implement steps in the foregoing methods. The function may be implemented by hardware, or may be implemented by hardware executing corresponding software. The hardware or software includes one or more modules corresponding to the foregoing functions.

In a possible implementation, the transmission apparatus may be an optical line terminal. The transmission apparatus may include a processing module and a transceiver module. These modules may perform corresponding functions of the optical line terminal in the foregoing method example. For details, refer to detailed descriptions in the method example. Details are not described here again.

In another possible implementation, the transmission apparatus may alternatively be an optical network unit. The transmission apparatus may include a transceiver module and a processing module. These modules may perform corresponding functions of the optical network unit in the foregoing method example. For details, refer to detailed descriptions in the method example. Details are not described here.

In a fifth aspect, this application provides a transmission system. The transmission system includes an optical line terminal and an optical network unit. The optical line terminal may be configured to perform the foregoing first aspect or any method in the first aspect. The optical network unit may be configured to perform the foregoing second aspect or any method in the second aspect.

Further, optionally, the transmission system may further include a PLC. The PLC may be configured to send configuration information of the PDO to the optical line terminal.

In a sixth aspect, this application provides a computer-readable storage medium. The computer-readable storage medium stores computer programs or instructions. When the computer programs or the instructions are executed by a transmission apparatus, so that the transmission apparatus performs the foregoing first aspect or the method in any possible implementation of the first aspect, or so that the transmission apparatus performs the foregoing second aspect or the method in any possible implementation of the second aspect.

In a seventh aspect, this application provides a computer program product. The computer program product includes computer programs or instructions. When the computer programs or the instructions are executed by a transmission apparatus, so that the transmission apparatus performs the foregoing first aspect or the method in any possible implementation of the first aspect, or so that the transmission apparatus performs the foregoing second aspect or the method in any possible implementation of the second aspect.

DESCRIPTION OF EMBODIMENTS

To describe technical solutions of this application more clearly, the following describes embodiments of this application with reference to accompanying drawings.

The technical solutions in embodiments of this application may be applied to various field bus systems, systems obtained after the field bus system are modified, and the like.

Some embodiments are directed to a transmission method, apparatus, and system, and may be applied to the field of optical communication technologies, to resolve problems of a large delay and a large delay jitter in a process of transmitting downlink service data in the conventional technology. The method may include: an optical head end generating uplink grant information of periodic data based on configuration information of the periodic data from a controller, where the uplink grant information of the periodic data is continuously valid within a threshold time range, and indicating a corresponding transmission slot of sending the periodic data by an optical terminal. The optical head end sends the uplink grant information of the periodic data to the optical terminal.

Figures 1, 2:
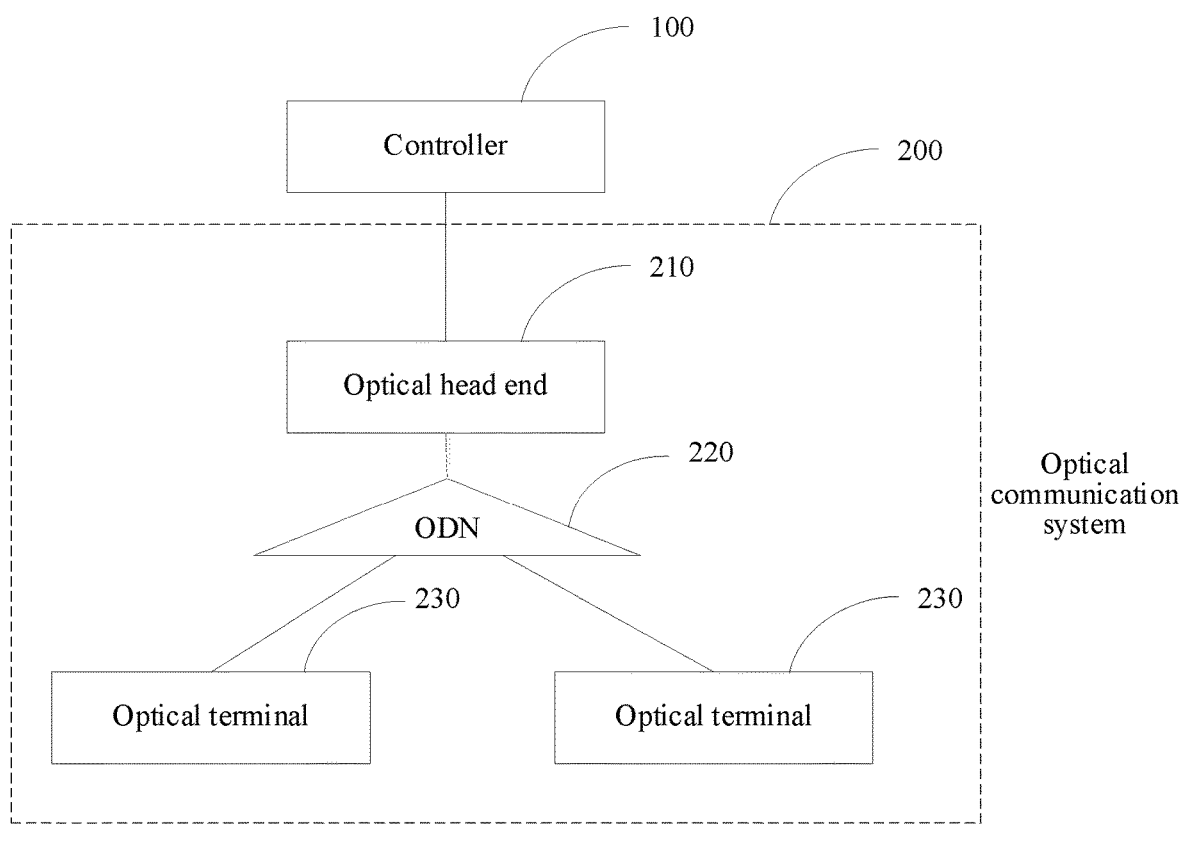
FIG. 1 is a schematic diagram of an architecture of a communication system which may be used in this application.
FIG. 2 is a schematic diagram of a connection structure of a communication system according to this application.

For ease of understanding embodiments of this application, a communication system shown in FIG. 1 is first used as an example to describe in detail the communication system applicable to embodiments of this application.

As shown in FIG. 1, the communications system may include a controller 100 and an optical communication system 200. Further, optionally, an optical bus network system may further include a field control device. The field control device is, for example, a transmission device (such as a servo driver and a servo motor), a sensing device (such as a sensor), or an input/output (I/O) device. It should be understood that these field control devices may be collectively referred to as secondary stations.

In an optional implementation of an embodiment of this application, the controller 100 may be a programmable logic controller (PLC). As a management center of the whole optical bus network system, PLC may be configured to manage various types of the field control devices.

The optical communication system 200 may include an optical head end 210, an optical distribution network 220 (ODN), and at least one optical terminal 230.

In an optional implementation in this embodiment of this application, the optical head end may be an optical line terminal (OLT). In other words, the OLT can implement a function of the optical head end.

In an optional implementation in this embodiment of this application, the optical terminal may be an optical network unit (ONU), and/or may be an optical network terminal (ONT). In other words, the ONT or the ONU can implement a function of the optical terminal.

For example, an internal structure of the communication system may be as shown in FIG. 1.

The PLC is connected to the OLT, the OLT is connected to the ODN through a feeder optical fiber, and the ODN is connected to the ONT through a distribution optical fiber.

It should be noted that the optical head end and the PLC may be deployed separately, or may be deployed in an integrated manner. In other words, the optical head end and the PLC may be deployed on different physical devices, or may be deployed on a same physical device. In other words, the optical head end and the PLC may be two independent physical devices, or may be two functional modules in the same physical device. In addition, the optical terminal and the secondary station may be deployed separately, or may be deployed in an integrated manner. In other words, the optical terminal and the secondary station are independent and different physical devices, or the optical terminal and the secondary station may be integrated devices. This is not limited in this application.

It should be further noted that Forms and quantities of structures in the optical bus network system shown in FIG. 1 are merely examples, and constitute no limitation on this application. In addition, quantities of the OLT, the ONT, an optical splitter included in the optical communication system in FIG. 1, and a quantity of a port included in the optical splitter are merely examples. This is not limited in this application. For example, a connection structure of content of the optical communication system in this embodiment of this application may alternatively be a connection structure shown in FIG. 2. This is not specifically limited.

Here, the optical communication system may be a PON system. The PON system may be, for example, a gigabit-capable passive optical network (gigabit-capable PON, GPON) system, an Ethernet passive optical network (Ethernet PON, EPON) system, a 10 gigabit Ethernet passive optical network (10G-EPON) system, a time and wavelength division multiplexing passive optical network (TWDM-PON) system, a 10-gigabit-capable passive optical network (XG-PON) system, or a 10-gigabit-capable symmetric passive optical network (XGS-PON) system. With emergence of a new technology that evolves in the future, a rate of the PON system may be increased to 25 Gbps, 50 Gbps, or even 100 Gbps. Therefore, the optical communication system may alternatively be a PON system with a higher transmission rate. This is not limited in this application.

In a possible implementation, the foregoing PON system may be a PON system that supports a single wavelength.

For ease of understanding, the following further describes some terms in embodiments of this application.

(1) A process data object (PDO) is used to transmit real-time data. It provides a direct access channel to a device application object, and is used to transmit real-time short frame data, for example, to transmit real-time control parameters or variables of devices of a secondary station, and has a higher priority. Each PDO has a unique identifier and may be sent by one node, but may be received by a plurality of nodes. The PDO is usually transmitted periodically, and may be usually referred to as periodic data. Usually, the periodic data has a high requirement on a delay. It should be noted that a data size of the periodic data is fixed. (2) A service data object (SDO) is used to send and receive service data, and has a low requirement on real-time performance. The SDO is usually used to configure and obtain a configuration parameter of a node (in other words, mainly used to configure the secondary station). Usually, it may be referred to as aperiodic data.

(3) A PLC is a digital operation operating electronic system specially designed for application in an industrial environment. The PLC uses a programmable memory to internally store instructions for performing operations such as logical operations, sequential control, timing, counting, and arithmetic operations, and controls various types of mechanical devices or production processes through digital or analog input and output.

(4) An ODN may provide an optical signal transmission channel between the optical head end 210 and the optical terminal 230, and the ODN does not include any electronic component or electronic power supply.

The ODN includes passive components such as a splitter and an optical fiber, and does not need active electronic devices. The splitter may alternatively be referred to as an optical splitter, and may be an optical fiber tandem component having a plurality of input ends and a plurality of output ends, which is configured to couple and distribute optical signals.

(5) An OLT is an important central office device. The OLT may be connected to a front-end (aggregation layer) switch through a network cable, convert an optical signal, and interconnect with a splitter of a user end through a single optical fiber, to implement control, management, and measurement of an ONU of a user end device. Similar to the ONU device, the OLT is an optoelectronic integrated device.

(6) An ONU includes a core functional circuit, common units such as a power supply and management, and a communication interface. A core functional block of the ONU includes a user and service multiplexing function, a transmission multiplexing function, and an ODN interface function. The user and service multiplexing function includes assembling information from users, allocating information to be transmitted to the users, and connecting individual service interface functions. The transmission multiplexing function includes analyzing a signal from the ODN, extracting a part of the signal the ONU, and properly arranging information to be sent to the ODN. The ODN interface function provides a series of optical physical interface functions, which include optical/electrical conversion and electrical/optical conversion.

(7) An ONT is a product in an access solution of the optical communication system.

In an optional implementation in embodiments of this application, the ONT is an ONU, which is an optical network terminal for the user end. Alternatively, the ONT is a part of the ONU.

A difference between the ONT and the ONU is that the ONT is an optical network terminal and is directly located at the user end, while the ONU is an optical network unit, and there may be another network, such as Ethernet, between the ONU and a user.

(8) A cycle period refers to a cycle period of a PLC. The cycle period includes a duration for collecting data (for example, speed, position, current, and the like of an industrial control device) by a secondary station, an input delay for transmitting sampled data to the PLC, a duration for the PLC to calculate based on the collected data, an output delay for the PLC to transmit a calculation result (or referred to as configuration data) to the secondary station, and a sum of a duration for the secondary station to receive the calculation result. Usually, the cycle period is preconfigured by the PLC.

In addition, the terms "system" and "network" in embodiments of this application may be used interchangeably. "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. The character "/" usually represents that the associated object is in an "or" relationship. At least one of the following items (pieces) or similar expressions refer to any combination of these items, including any combination of singular items (pieces) or plural items (pieces). For example, at least one of a, b, or c may represent: a, b, c, a-b, a-c, b-c, or a-b-c, where a, b, and c may be one or more.

Unless otherwise specified, ordinal numbers such as "first" and "second" mentioned in embodiments of this application are used for distinguishing a plurality of objects, and are not used for limiting a sequence, a time sequence, a priority, or an importance degree of the plurality of objects. In addition, the terms "include" and "have" in embodiments of this application, the claims, and the accompanying drawings are not exclusive. For example, a process, a method, a system, a product, or a device that includes a series of steps or modules is not limited to the listed steps or modules, and may further include steps or modules that are not listed.

For ease of description, an example in which an optical head end is an OLT and an optical terminal is an ONT is used for description subsequently in this application. In other words, all OLTs described subsequently in this application may be replaced with optical head ends, and all ONTs may be replaced with optical terminals. It should be understood that the optical terminal may alternatively be an optical network unit (ONU).

Figure 3:
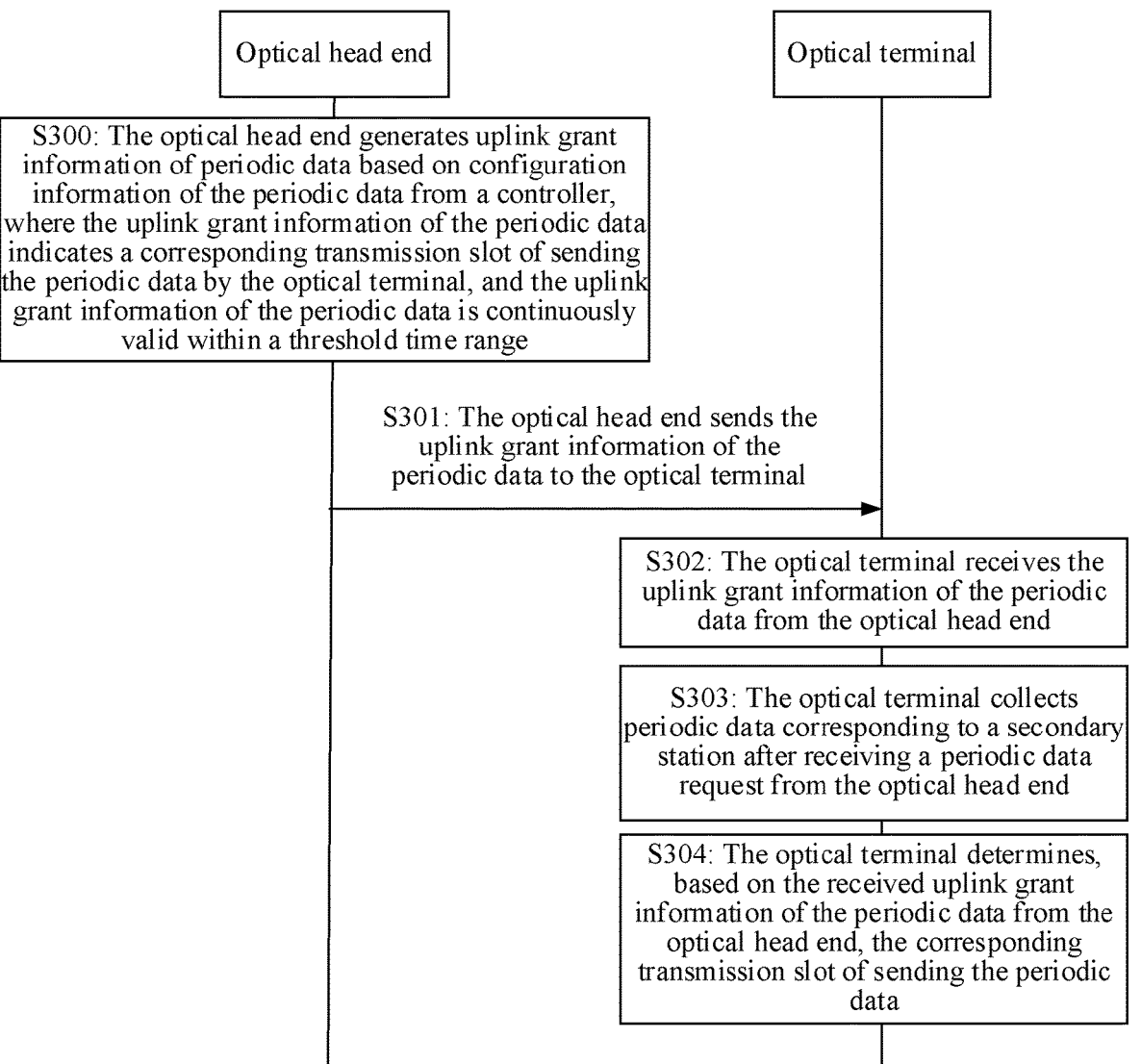
FIG. 3 is a schematic flowchart of a transmission method according to this application.

Specifically, FIG. 3 is a schematic flowchart of a transmission method according to an embodiment of this application. The method includes the following steps.

S300: An optical head end generates uplink grant information of periodic data based on configuration information of the periodic data from a controller. The uplink grant information of the periodic data indicates a corresponding transmission slot of sending the periodic data by an optical terminal. The uplink grant information of the periodic data is continuously valid within a threshold time range.

In an optional implementation in this embodiment of this application, when the OLT orchestrates a downlink frame, locations of fixed slots of a PDO service in each fixed slot are relatively consistent as far as possible, to effectively ensure a minimum delay jitter.

For example, when the OLT orchestrates the downlink frame, locations of the fixed slots of the PDO service in each 31.25 μs are relatively consistent as far as possible, to effectively ensure a minimum delay jitter. For example, the OLT may orchestrate the fixed slots of the PDO service sequentially starting from a tail position of the 31.25 μs.

S301: The optical head end sends the uplink grant information of the periodic data to the optical terminal.

Further, in this embodiment of this application, there are a plurality of cases in which the uplink grant information of the periodic data is valid within the threshold time range. This is not specifically limited to the following several cases:

In a first case, the uplink grant information of the periodic data is continuously valid before the optical head end reconfigures the uplink grant information of the periodic data.

In a second case, the uplink grant information of the periodic data is continuously valid in a normal timing period of a timer.

In other words, the optical head end does not deliver the uplink grant information of the periodic data each time when sending a downlink packet to the optical terminal, and sends the uplink grant information of the periodic data to the optical terminal only when a threshold duration is reached.

Because the optical head end effectively reduces a quantity of sending the uplink grant information, and reduces a size of a BWMAP field of a downlink frame header, waiting time for sending downlink service data can be effectively avoided and a delay can be reduced.

For example, it is assumed that a timing duration set by the timer is A seconds, after the optical head end sends the uplink grant information of the periodic data to the optical terminal, the timer is started, and the timer performs timing. After the timer expires, the optical head end sends the uplink grant information of the periodic data to the optical terminal again.

In an optional implementation in this embodiment of this application, the optical head end sends the uplink grant information of the periodic data to the optical terminal in a pre-configuration phase.

In other words, in a service transmission process between the optical head end and the optical terminal, the optical head end does not need to send the uplink grant information of the periodic data to the optical terminal.

Because the optical head end sends the uplink grant information of the periodic data to the optical terminal only in the pre-configuration phase, a quantity of sending the uplink grant information is effectively reduced. For example, in a cycle period, the optical head end does not deliver a bandwidth map (BWMAP) of the periodic data to the optical terminal, and a size of a BWMAP field of a downlink frame header is reduced. This can effectively avoid waiting time for sending downlink service data and reduce a delay.

S302: The optical terminal receives the uplink grant information of the periodic data from the optical head end.

In an optional implementation in this embodiment of this application, the uplink grant information of the periodic data indicates a corresponding fixed slot of sending the periodic data.

Further, because the uplink grant information of the periodic data is continuously valid within the threshold time range, after the optical terminal receives the uplink grant information of the periodic data from the optical head end once, within the threshold time range, subsequent uplink grant information of the periodic data from the optical head end may be ignored or rejected.

S303: The optical terminal collects periodic data corresponding to a secondary station after receiving a periodic data request from the optical head end.

S304: The optical terminal determines, based on received uplink grant information of the periodic data from the optical head end, a corresponding transmission slot of sending the periodic data.

For example, it is assumed that a current communication system includes an ONU 1 to an ONU 6 and that a cycle period of one PDO is 125 µs.

Content indicated by uplink grant information of the PDO generated by the OLT based on configuration information of the PDO from a PLC may be shown in the following table:

TABLE 1

| Correspondences between ONUs indicated in the uplink grant information of the PDO and transmission slots | | |
| --- | --- | --- |
| ONU ID | Service type | Period (µs) |
| 1, 2, 3 | Real-time primary/secondary mode | 31.25 µs |
| 4, 5 | Real-time primary/secondary mode | 62.5 µs |
| 6 | Real-time active reporting | 125 µs |

Therefore, the ONU may determine, based on received uplink grant information of the PDO, that the ONU 1, the ONU 2, and the ONU 3 perform scheduling in each fixed slot period 31.25 µs, the ONU 4 and the ONU 5 perform scheduling in each fixed slot period 62.5 µs, and the ONU 6 performs scheduling in each fixed slot period 125 µs.

S305: The optical terminal sends the periodic data to the optical head end based on the transmission slot corresponding to the periodic data.

Figure 4:
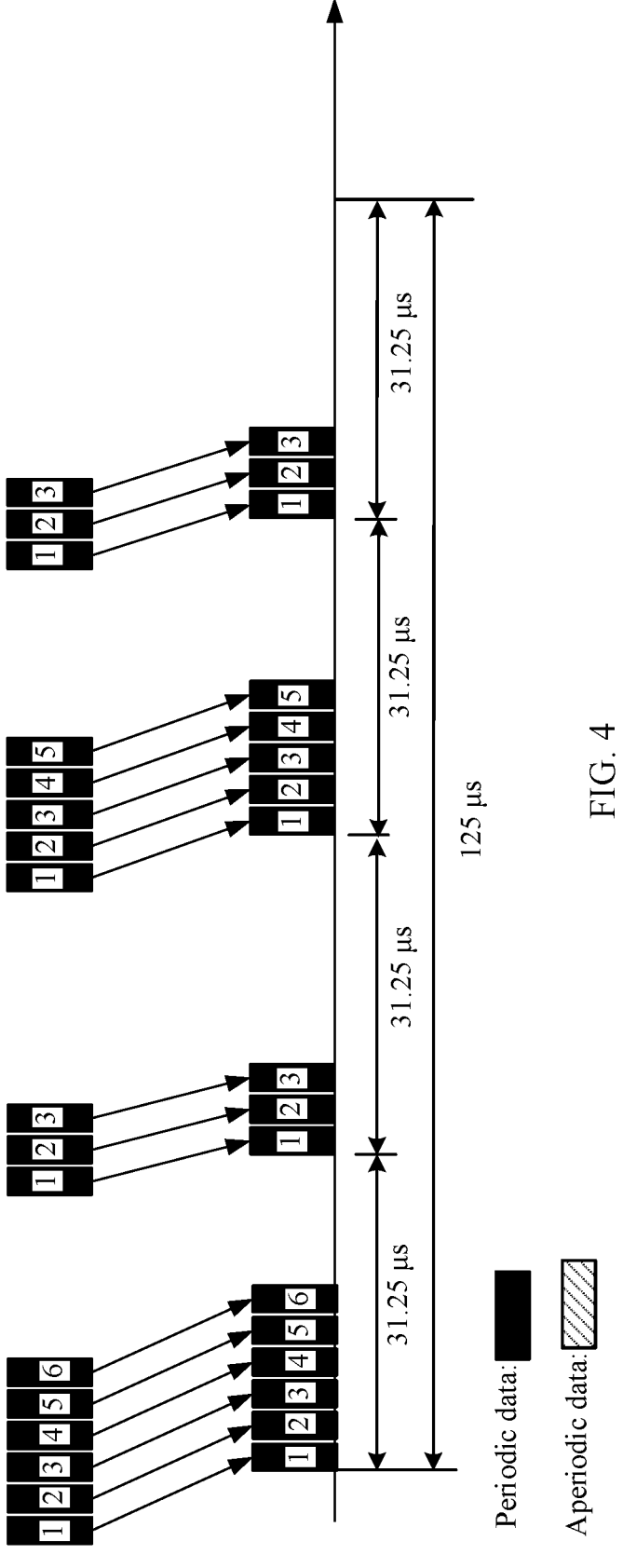
FIG. 4 is a schematic diagram of PDO service scheduling according to an embodiment of this application.

For example, based on the content in Table 1, when communication transmission is performed between the OLT and the ONU, a case in which the ONU transmits data may be shown in FIG. 4. In other words, the ONU 1, the ONU 2, and the ONU 3 perform scheduling in each fixed slot period 31.25 µs, the ONU 4 and the ONU 5 perform scheduling in each fixed slot period 62.5 µs, and the ONU 6 performs scheduling in each fixed slot period 125 µs.

In an optional implementation in this embodiment of this application, the uplink grant information of the periodic data is carried in an administration and maintenance message in a frame structure sent by the optical head end to the optical terminal.

In this embodiment of this application, there is a plurality of cases in which the uplink grant information of the periodic data is carried in the administration and maintenance message in the frame structure sent by the optical head end to the optical terminal. This is not specifically limited to the following cases.

In a first carrying case, the uplink grant information of the periodic data is carried in a PLOAMd message in the frame structure sent by the optical head end to the optical terminal.

In an optional implementation in this embodiment of this application, the PLOAMd message includes a correspondence between an optical terminal identifier and a periodic data transmission slot.

Figure 5:
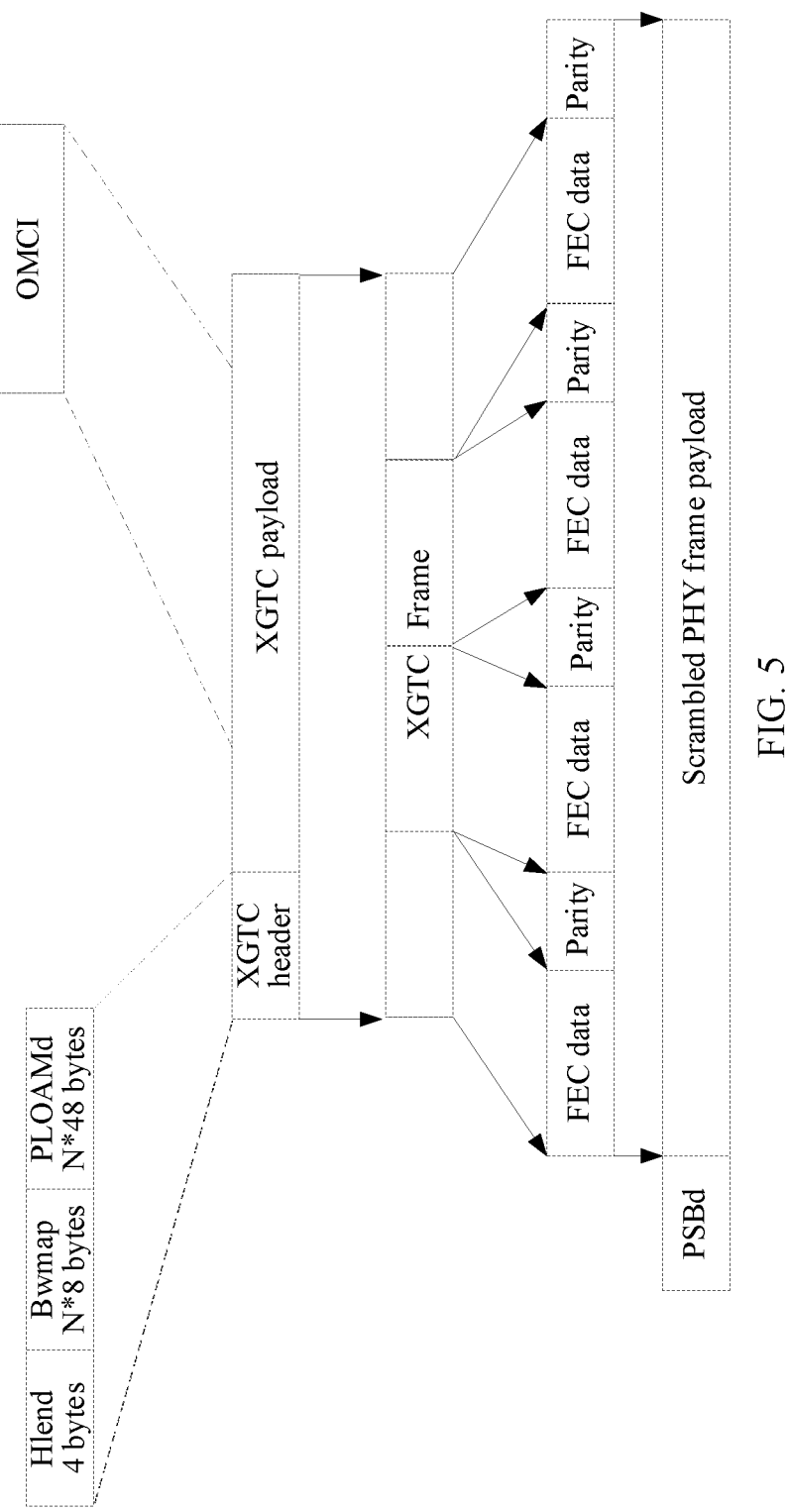
FIG. 5 is a schematic diagram of a frame structure according to this application.

For example, in this embodiment of this application, the optical head end includes the grant information of the periodic data in the PLOAMd message in the frame structure shown in FIG. 5.

Because the PLOAMd message only needs to be sent in the pre-configuration phase of the optical head end and the optical terminal, compared with an existing case in which the grant information of the periodic data is carried in a BWMAP of the frame structure, a size of a BWMAP field of a downlink frame header can be effectively reduced. This can effectively avoid waiting time for sending downlink service data and reduce a delay.

In a second carrying case, the uplink grant information of the periodic data is carried in an OMCI message in the frame structure sent by the optical head end to the optical terminal.

In an optional implementation in this embodiment of this application, the OMCI message includes a correspondence between an optical terminal identifier and a periodic data transmission slot.

For example, in this embodiment of this application, the optical head end includes the grant information of the periodic data in the OMCI message in the frame structure shown in FIG. 5.

Because the OMCI message only needs to be sent in the pre-configuration phase of the optical head end and the optical terminal, compared with an existing case in which the grant information of the periodic data is carried in a BWMAP of the frame structure, a size of a BWMAP field of a downlink frame header can be effectively reduced. This can effectively avoid waiting time for sending downlink service data and reduce a delay.

Further, this application provides optional content of the uplink grant information of the periodic data.

For example, the uplink grant information of the periodic data includes at least one information group, where each optical terminal corresponds to at least one information group, and each information group includes Allocid, start-time, and grantsize.

Further, in this embodiment of this application, a type of data exchanged between the optical head end and the optical terminal may alternatively be an SDO type.

Specifically, the optical head end determines uplink grant information of the SDO after receiving an SDO request from the PLC. The uplink grant information of the SDO indicates a corresponding transmission slot of sending the aperiodic data by the optical terminal. The optical head end sends the uplink grant information of the SDO to the optical terminal.

In an optional implementation in this embodiment of this application, the transmission slot corresponding to the aperiodic data in the uplink grant information of the SDO is the remaining slot other than the transmission slot corresponding to the periodic data.

For example, it is assumed that a current communication system includes an ONU 1 to an ONU 6 and an ONU 10 to an ONU 12, and that a cycle period of one PDO is 125 μs. The ONU 1 to the ONU 6 in the communication system mainly transmit data of a PDO type, and the ONU 10 to the ONU 12 mainly transmit data of a SDO type.

For example, correspondences between ONU identifiers and service types and the like in the communications system may be shown in Table 2.

TABLE 2

| Correspondences between ONU identifiers and service types and periods | | |
|---|---|---|
| ONU ID | Service type | Period (μs) |
| 1, 2, 3 | Real-time primary/secondary mode | 31.25 μs |
| 4, 5 | Real-time primary/secondary mode | 62.5 μs |
| 6 | Real-time active reporting | 125 μs |
| 10, 11, 12 | Non-real-time | QoS guarantee based on a service packet priority |

The OLT has determined the uplink grant information of the PDO in a pre-configuration phase, and sent the uplink grant information of the PDO to the ONU.

Further, the OLT determines, with reference to the previously configured uplink grant information of the PDO, the uplink grant information of the SDO after receiving an SDO request from the PLC.

Figure 6:
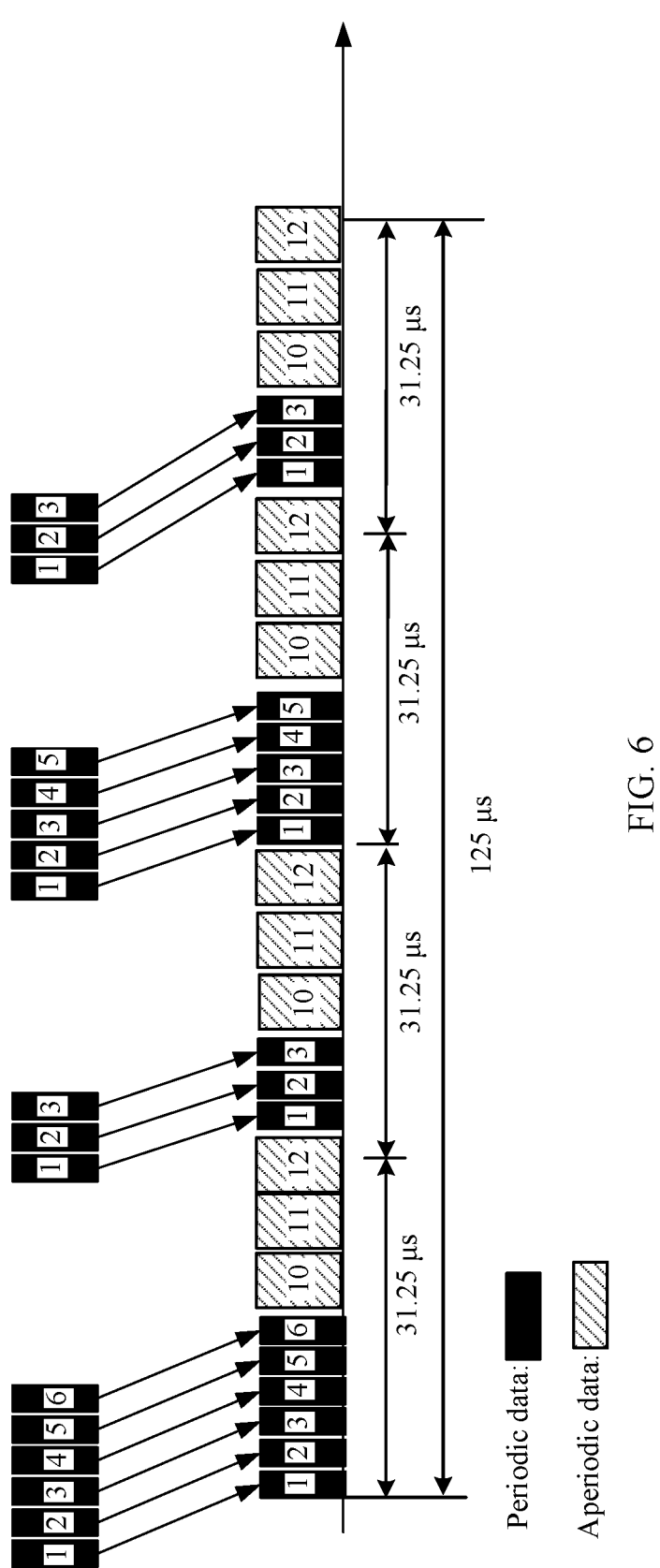
FIG. 6 is a schematic diagram of SDO service scheduling according to this application.

For example, based on the content in Table 2, when SDO transmission is performed between the OLT and the ONU, a case in which the ONU transmit data transmission may be shown in FIG. 6. In other words, the ONU 10 to the ONU 12 that perform the SDO transmission perform scheduling by using the remaining slot other than a fixed slot.

In an optional implementation in this embodiment of this application, the uplink grant information of the periodic data is carried in a BWMAP message in a frame structure sent by the optical head end to the optical terminal.

In an optional implementation in this embodiment of this application, the BWMAP message includes a correspondence between an optical terminal identifier and an aperiodic data transmission slot.

For example, in this embodiment of this application, the optical head end includes the grant information of the periodic data in the BWMAP message in the frame structure shown in FIG. 5.

In an optional implementation in this embodiment of this application, the BWMAP message indicating the uplink grant information of the aperiodic data indicates a slot of a next uplink frame, and needs to be delivered each time.

Further, this application provides optional content of the uplink grant information of the aperiodic data.

For example, the uplink grant information of the aperiodic data includes at least one information group, where each optical terminal corresponds to at least one information group, and each information group includes Allocid, start-time, and grantsize.

Further, this embodiment of this application is separately described based on different data exchange scenarios, and are not specifically limited to the following several scenarios.

In a first scenario, the data type of exchange between a PLC and a secondary station is PDO.

Figure 7:
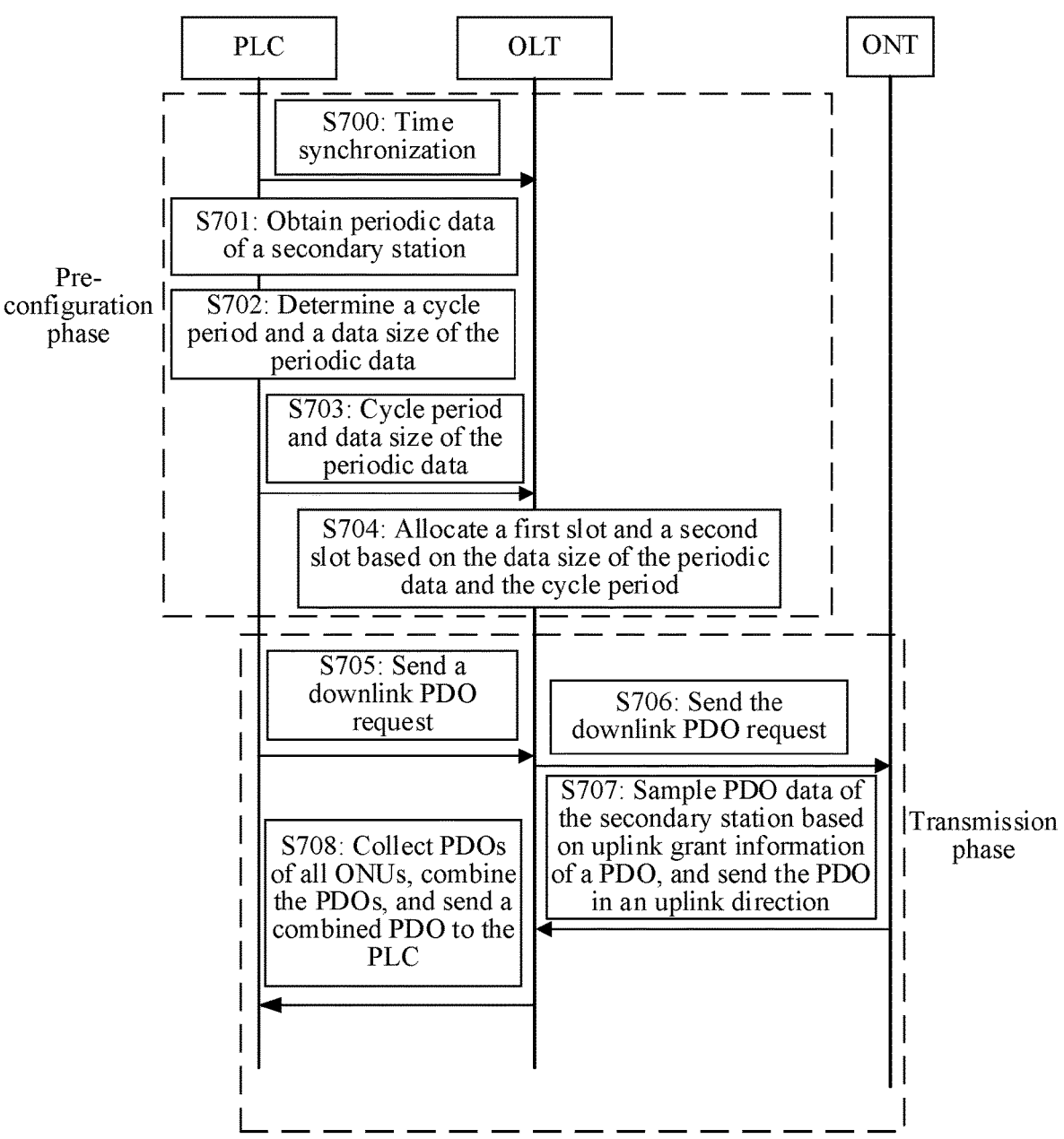
FIG. 7 is a schematic flowchart of a first transmission scenario according to this application.

Specifically, FIG. 7 is a schematic flowchart of a transmission method according to an embodiment of this application. The method includes the following steps.

Phase 1: pre-configuration phase.

S700: A PLC performs time synchronization with an OLT.

S701: The PLC obtains periodic data of a secondary station.

Here, the PLC can parse a configuration file (such as an extensible markup language (XML) file) of the secondary station, to obtain the periodic data of the secondary station. The configuration file of the secondary station includes each configuration parameter and size of the secondary station.

Alternatively, the secondary station may report the periodic data of the secondary station to the PLC through an uplink OMCI message.

S702: The PLC determines a cycle period and a data size of the periodic data.

The periodic data may be, for example, a process data object (PDO). The PDO is used to transfer a real-time control parameter or variable of each device of the secondary station, and exchange of the PDO is periodically transferred. Usually, the periodic data has a high requirement on a delay. A data size of the periodic data is fixed.

In a possible implementation, the OLT may obtain the cycle period and the data size of the periodic data in the following three possible manners.

In a first manner, the OLT receives the cycle period and the data size of the periodic data from the PLC.

Based on the manner 1, the PLC may pre-configure a cycle period, and receive periodic data reported by the secondary station. Accordingly, the PLC may determine the data size of the received periodic data. Further, the PLC sends the cycle period and the data size of the periodic data to the OLT.

In a second manner, the OLT receives the cycle period from the PLC and receives periodic data from the secondary station.

Based on the manner 2, the PLC may pre-configure a cycle period, and send the cycle period to the OLT. The OLT may receive the periodic data from the secondary station and determine a data size of the periodic data.

In a third manner, the cycle period and the data size of the periodic data is directly written into the OLT.

For example, the cycle period and the data size of the periodic data may be written into a memory area of the OLT through a serial peripheral interface (SPI).

S703: The PLC sends the cycle period and the data size of the periodic data to the OLT.

Herein, the PLC may send the cycle period and the data size of the periodic data to the OLT through a management channel between the PLC and the OLT.

S704: The OLT generates uplink grant information of the PDO based on the cycle period and the data size of the periodic data. The uplink grant information of the PDO indicates a corresponding transmission slot of sending the periodic data by the optical terminal. The uplink grant information of the periodic data is continuously valid within a threshold time range.

Second phase: service transmission phase.

S705: The PLC sends a downlink PDO request to the OLT in a small period.

S706: The OLT delivers the received PDO request to the ONU.

S707: The ONU samples the PDO data of the secondary station based on the uplink grant information of the PDO that is received in the pre-configuration phase, and sends the PDO in an uplink direction.

S708: After collecting PDOs sent by all ONUs, the OLT combines the PDOs and sends a combined PDO to the PLC.

A case of the uplink grant information of the PDO may alternatively be another case described above. For brevity, details are not described here again.

In a second scenario, the data type of exchange between a PLC and a secondary station is SDO.

Figure 8:
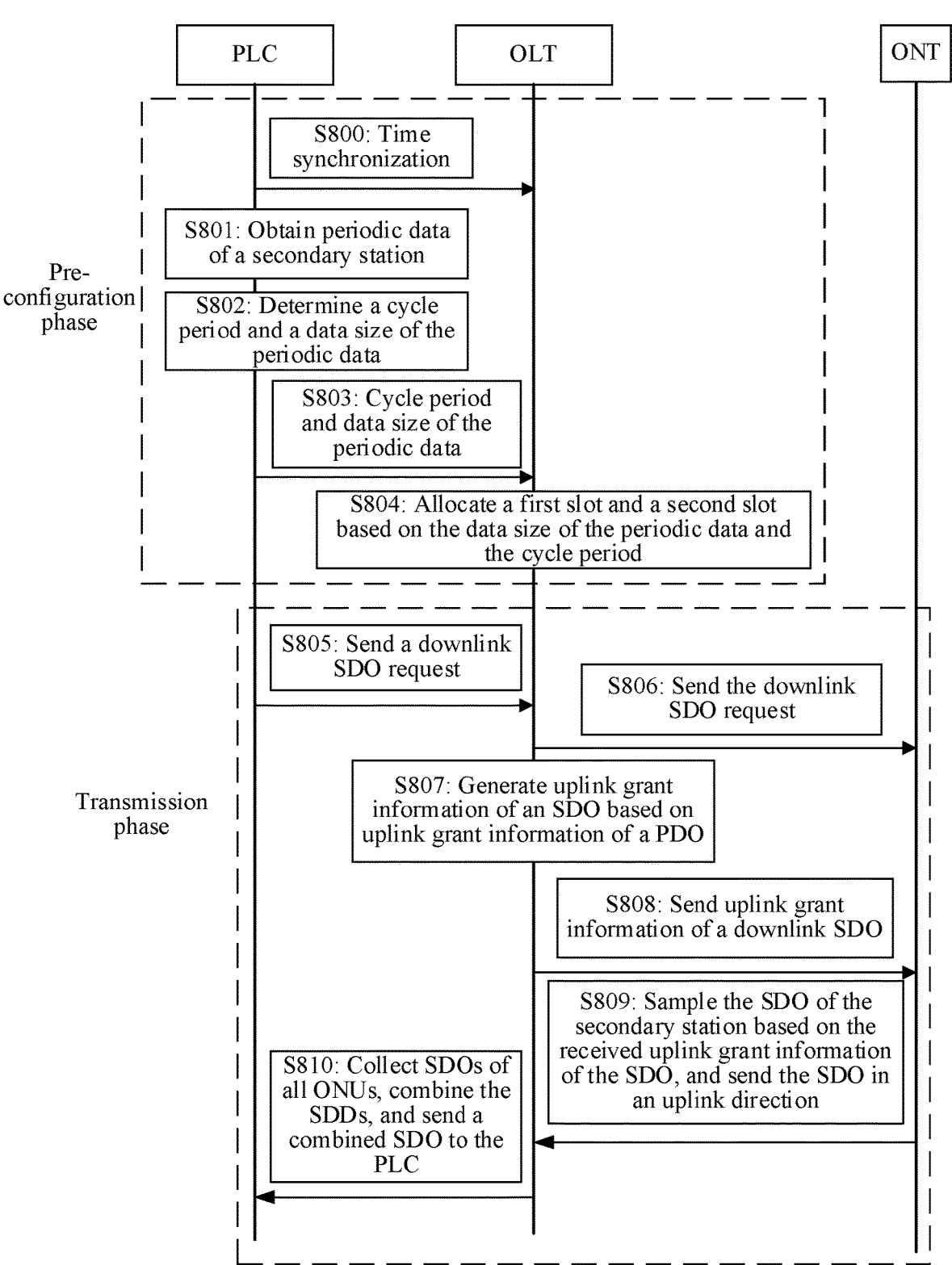
FIG. 8 is a schematic flowchart of a second transmission scenario according to this application.

Specifically, FIG. 8 is a schematic flowchart of a transmission method according to an embodiment of this application. The method includes the following steps.

Phase 1: pre-configuration phase.

S800: A PLC performs time synchronization with an OLT.

S801: The PLC obtains periodic data of a secondary station.

For brief description, for the step, refer to the related description in S6*oi*. Details are not described here again.

S802: The PLC determines a cycle period and a data size of the periodic data.

For brief description, for the step, refer to the related description in S702. Details are not described here again.

S803: The PLC sends the cycle period and the data size of the periodic data to the OLT.

Herein, the PLC may send the cycle period and the data size of the periodic data to the OLT through a management channel between the PLC and the OLT.

S804: The OLT generates uplink grant information of the PDO based on the cycle period and the data size of the periodic data. The uplink grant information of the PDO indicates a corresponding transmission slot of sending the periodic data by the optical terminal. The uplink grant information of the periodic data is continuously valid within a threshold time range.

Second phase: service transmission phase.

S805: The PLC sends a downlink SDO request to the OLT in a small period.

S806: The OLT delivers the received SDO request to the ONU.

S807: The OLT generates uplink grant information of an SDO based on the uplink grant information of the PDO. The uplink grant information of the SDO indicates a corresponding transmission slot of sending the aperiodic data by the optical terminal.

The transmission slot corresponding to the aperiodic data is the remaining slot other than the transmission slot corresponding to the periodic data.

S808: The OLT sends the uplink grant information of the SDO to the ONU.

S809: The ONU samples the SDO of the secondary station based on the received uplink grant information of the SDO, and sends the SDO in an uplink direction.

S810: After collecting SDOs sent by all ONUs, the OLT combines the SDOs and sends a combined SDO to the PLC.

A case in which the OLT sends the uplink grant information of the PDO to the ONU may alternatively be another case described above. For brevity, details are not described here again.

It should be noted that the foregoing steps constitute no limitation on this embodiment of this application. Any sequence change or variation corresponding to the foregoing steps shall fall within the protection scope of this application. For example, sequences of S706 to S708 may be exchanged.

The data exchange scenario in this embodiment of this application may alternatively be a combination of a scenario one and a scenario two. In other words, when the data exchange scenario includes both an SDO and a PDO, descriptions of the foregoing scenario one and scenario two may be briefly described. Details are not described here again.

According to the foregoing descriptions of solutions in this application, it may be understood that, to implement the foregoing functions, the foregoing devices include corresponding hardware structures and/or software modules for performing the functions. A person of ordinary skill in the art should easily be aware that, in combination with the examples described in this embodiment disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figures 9, 10:
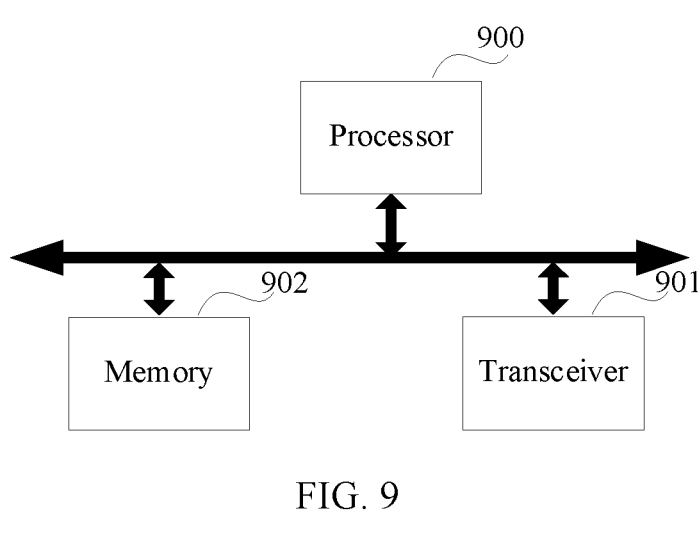
FIG. 9 is a schematic diagram of a structure of a transmission apparatus according to this application.
FIG. 10 is a schematic diagram of a structure of a transmission apparatus according to this application.

Based on the foregoing embodiments, as shown in FIG. 9, an embodiment of this application further provides a transmission apparatus. The apparatus includes a processor 900 and a transceiver 901. The processor 900 and the transceiver 901 are coupled to each other. It may be understood that the transceiver 901 may be an interface circuit or an input/output interface, and is configured to receive and send data under control of the processor 900. Optionally, the transmission apparatus may further include a memory 902, configured to store instructions executed by the processor 900, store input data required by the processor 900 to run the instructions, or store data generated after the processor 900 runs the instructions.

The processor 900 may be a central processing unit (CPU), a network processor (NP), or a combination of the CPU and the NP. The processor 900 may further include a hardware chip. The foregoing hardware chip may be an application-specific integrated circuit (ASIC), a programmable logic device (PLD), or a combination thereof. The PLD may be a complex programmable logic device (CPLD), a field-programmable logic gate array (field-programmable gate array, FPGA), generic array logic (GAL), or any combination thereof. The memory 902 may include: any medium that can store program code, a USB flash drive, a removable hard disk, a read-only memory (ROM), a random access memory (RAM), a magnetic disk, an optical disc, and the like.

When the transmission apparatus is an optical head end, the processor 900 is configured to read and execute a program in the memory 902.

A method process is performed by the optical head end in S300 to S305 shown in FIG. 3, a method process is performed by the optical head end in S700 to S708 shown in FIG. 7, or a method process is performed by the optical head end in S800 to S810 shown in FIG. 8.

When the transmission apparatus is an optical terminal, the processor 900 is configured to read and execute a program in the memory 902.

A method process is performed by the optical terminal in S300 to S305 shown in FIG. 3, a method process is performed by the optical terminal in S700 to S708 shown in FIG. 7, or a method process is performed by the optical terminal in S800 to S810 shown in FIG. 8.

As shown in FIG. 10, the present invention provides a transmission apparatus. The transmission apparatus includes: at least one processing module 1000 and at least one transceiver module 1001. The transceiver module 1001 is configured to receive and send data under control of the processing module woo.

In an optional implementation in this embodiment of this application, the transmission apparatus is an optical head end. When the program code is executed by the processing module 1000, the processing module 1000 is enabled to perform the following process:

generating uplink grant information of periodic data based on configuration information of the periodic data from the controller, where the uplink grant information of the periodic data indicates a corresponding transmission slot of sending the periodic data by the optical terminal; and the uplink grant information of the periodic data is continuously valid within a threshold time range; and sending the uplink grant information of the periodic data to the optical terminal.

In a possible implementation, the uplink grant information of the periodic data is continuously valid before the optical head end reconfigures the uplink grant information of the periodic data.

In a possible implementation, the optical head end sends the uplink grant information of the periodic data to the optical terminal in a pre-configuration phase.

In a possible implementation, the uplink grant information of the periodic data is carried in an administration and maintenance message in a frame structure sent by the optical head end to the optical terminal.

In a possible implementation, the uplink grant information of the periodic data is carried in a PLOAMd message in the frame structure sent by the optical head end to the optical terminal. The PLOAMd message includes a correspondence between an optical terminal identifier and a periodic data transmission slot. Alternatively, the uplink grant information of the periodic data is carried in an OMCI message in the frame structure sent by the optical head end to the optical terminal. The OMCI message includes a correspondence between an optical terminal identifier and a periodic data transmission slot.

In a possible implementation, the processing module woo is further configured to:

determine uplink grant information of aperiodic data after receiving an aperiodic data request from the controller, where the uplink grant information of the aperiodic data indicates a corresponding transmission slot of sending the aperiodic data by the optical terminal; and send the aperiodic data request and the uplink grant information of the aperiodic data to the optical terminal.

In a possible implementation, the transmission slot corresponding to the aperiodic data is the remaining slot other than the transmission slot corresponding to the periodic data.

In a possible implementation, the uplink grant information of the aperiodic data is carried in the BWMAP message in the frame structure sent by the optical head end to the optical terminal.

In a possible implementation, the uplink grant information of the periodic data includes: at least one information group, where each optical terminal corresponds to at least one information group, and each information group includes Allocid, starttime, and grantsize.

In an optional implementation in this embodiment of this application, the processing apparatus is an optical terminal. When the program code is executed by the processing module moo, the processing module woo is enabled to perform the following process:

collecting periodic data corresponding to a secondary station after receiving a periodic data request from an optical head end; determining, based on received uplink grant information of the periodic data from the optical head end, a corresponding transmission slot of sending the periodic data, where the uplink grant information of the periodic data is continuously valid within a threshold time range; and sending the periodic data to the optical head end based on the transmission slot corresponding to the periodic data.

In a possible implementation, the uplink grant information of the periodic data is continuously valid before the optical head end reconfigures the uplink grant information of the periodic data.

In a possible implementation, the grant information of the periodic data is received by the optical terminal from the optical head end in a pre-configuration phase.

In a possible implementation, the grant information of the periodic data is received by the optical terminal from the optical head end in a pre-configuration phase.

In a possible implementation, the uplink grant information of the periodic data is carried in an administration and maintenance message in a frame structure sent by the optical head end to the optical terminal.

In a possible implementation, the uplink grant information of the periodic data is carried in a PLOAMd message in the frame structure sent by the optical head end to the optical terminal. The PLOAMd message includes a correspondence between an optical terminal identifier and a periodic data transmission slot. Alternatively, the uplink grant information of the periodic data is carried in an OMCI message in the frame structure sent by the optical head end to the optical terminal. The OMCI message includes a correspondence between an optical terminal identifier and a periodic data transmission slot.

In a possible implementation, the processing module 1000 is further configured to:

receive an aperiodic data request and uplink grant information of aperiodic data from the optical head end, where the uplink grant information of the aperiodic data indicates a corresponding transmission slot of sending the aperiodic data by the optical terminal; send the aperiodic data to the optical head end based on the transmission slot corresponding to the periodic data.

In a possible implementation, the transmission slot corresponding to the aperiodic data is the remaining slot other than the transmission slot corresponding to the periodic data.

In a possible implementation, the uplink grant information of the periodic data includes: at least one information group, where each optical terminal corresponds to at least one information group, and each information group includes Allocid, starttime, and grantsize.

Functions of the transceiver module 1001 and the processing module 1000 shown in FIG. 10 may be performed by the processor 900 by running a program in the memory 902, or separately performed by the processor 900.

The transmission apparatus shown in FIG. 10 may be the optical head end in the foregoing embodiment, or a chip in the optical head end, or may be the optical terminal in the foregoing embodiment, or a chip in the optical terminal.

In addition, the transmission apparatus shown in FIG. 10 may further include at least one storage module, and the storage module stores program code.

In some possible implementations, each aspect of the transmission method provided in an embodiment of the present invention may be further implemented in a form of a program product, including the program code. When the program code runs on a computer device, the program code is used for making the computer device to perform steps in the transmission method according to various examples of implementations of the present invention described in this specification.

The program product may use any combination of one or more readable media. The readable medium may be a readable signal medium or a readable storage medium. The readable storage medium may be, for example, but is not limited to, an electrical, magnetic, optical, electromagnetic, infrared, or semiconductor system, apparatus, or device, or any combination thereof. More specific examples (non-exhaustive list) of the readable storage media include: an electrical connection having one or more conductors, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The program product for performing transmission according to the implementation of the present invention may use a portable compact disk read-only memory (CD-ROM) and include program code, and may run on a server device. However, the program product in this application is not limited here. In this specification, the readable storage medium may be any tangible medium that includes or stores a program, and the program can be transmitted as information and used by an apparatus or a component or used in combination with an apparatus or a component.

The readable signal medium may include a data signal that is propagated in a baseband or as part of a cell. The data signal includes readable program code. The propagated data signal may take a plurality of forms, including, but not limited to, an electromagnetic signal, an optical signal, or any suitable combination of the foregoing signals. The readable signal medium may alternatively be any readable medium other than the readable storage medium. The readable medium may send, propagate, or transmit a program for use by or in conjunction with a cycle network action system, apparatus, or device.

The program code included on the readable medium may be transmitted using any suitable medium, including, but not limited to, a wireless medium, a wired medium, an optical cable, an RF medium, or the like, or any suitable combination of the foregoing medium.

Program code for performing operations of the present invention may be written in any combination of one or more programming languages. The programming languages include object-oriented programming languages, such as Java, C++, and the like, as well as conventional procedural programming languages, such as "C" or similar programming languages. The program code may be executed entirely on a user computing device, partially on the user computing device, as a standalone software package, partially on the user computing device and partially on a remote computing device, or entirely on the remote computing device or server. In a case involving the remote computing device, the remote computing device may be connected to the user computing device through any kind of network, including a local area network (LAN) or a wide area network (WAN), or may be connected to an external computing device.

An embodiment of this application further provides a computing device readable storage medium for a transmission method performed by a terminal device, to be specific, content is not lost after a power failure. The storage medium stores a software program, including program code. When the program code runs on the computing device, the software program can implement any one of the foregoing transmission solutions in this embodiment of this application when being read and executed by one or more processors.

The foregoing describes this application with reference to block diagrams and/or flowcharts that show the method, the apparatus (system), and/or the computer program product according to embodiments of this application. It should be understood that a block in the block diagrams and/or a block in the flowcharts and a combination of a block in the block diagram and/or a block in the flowcharts may be implemented by using computer program instructions. These computer program instructions may be provided to a general purpose computer, a processor of a special purpose computer, and/or another programmable data processing apparatus to generate a machine, such that the instructions executed by the computer processor and/or another programmable data processing apparatus create a method for implementing functions/acts specified in the block diagrams and/or flowchart blocks.

Accordingly, this application may be further implemented by using hardware and/or software (including firmware, resident software, microcode, and the like). Further, this application may take a form of a computer program product on a computer-usable or computer-readable storage medium having computer-usable or computer-readable program code implemented in the medium for use by or in conjunction with an instruction execution system. In context of this application, the computer may use or the computer-readable medium may be any medium that may include, store, communicate, transport, or transmit a program for use by or in conjunction with an instruction execution system, apparatus, or device.

Although this application has been described with reference to specific features and embodiments thereof, it is obvious that various modifications and combinations may be made to this application without departing from the spirit and scope of this application. Correspondingly, the specification and the accompanying drawings are merely example descriptions of this application defined in the appended claims, and are considered as any of or all modifications, variations, combinations, or equivalents that cover the scope of this application. It is clear that a person skilled in the art can make various modifications and variations to this application without departing from the scope of this application. In this way, this application is intended to cover these modifications and variations of this application provided that they fall within the scope of protection defined in the following claims and their equivalent technologies.

What is claimed is:

1. A transmission method, comprising:
generating, by an optical head end, uplink grant information of periodic data based on configuration information of the periodic data from a controller, wherein the uplink grant information of the periodic data indicates a corresponding transmission slot of sending the periodic data by an optical terminal, and the uplink grant information of the periodic data is continuously valid within a threshold time range; and
sending, by the optical head end, the uplink grant information of the periodic data to the optical terminal in a pre-configuration phase.

2. The method according to claim 1, wherein the uplink grant information of the periodic data is continuously valid within the threshold time range by being continuously valid before the optical head end reconfigures the uplink grant information of the periodic data.

3. The method according to claim 1, wherein the uplink grant information of the periodic data is carried in an administration and maintenance message in a frame structure sent by the optical head end to the optical terminal.

4. The method according to claim 3, wherein:
the uplink grant information of the periodic data is carried in a physical layer operations, administration and maintenance downstream PLOAMd message in the frame structure sent by the optical head end to the optical terminal, and the PLOAMd message comprises a correspondence between an optical terminal identifier and a periodic data transmission slot; or
the uplink grant information of the periodic data is carried in an ONT management and control interface OMCI message in the frame structure sent by the optical head end to the optical terminal, and the OMCI message comprises the correspondence between the optical terminal identifier and the periodic data transmission slot.

5. The method according to claim 1, wherein the method further comprises:
determining, by the optical head end, uplink grant information of aperiodic data after receiving an aperiodic data request from the controller, wherein the uplink grant information of the aperiodic data indicates a corresponding transmission slot of sending the aperiodic data by the optical terminal; and
sending, by the optical head end, the aperiodic data request and the uplink grant information of the aperiodic data to the optical terminal.

6. The method according to claim 5, wherein the transmission slot corresponding to the aperiodic data is a remaining slot other than the transmission slot corresponding to the periodic data.

7. The method according to claim 1, wherein the uplink grant information of the periodic data comprises:
at least one information group, wherein each optical terminal of a plurality of optical terminals corresponds to at least one information group, and each information group comprises an allocation number, a start time, and a grant size.

8. A transmission method, comprising:
collecting, by an optical terminal, periodic data corresponding to a secondary station after receiving a periodic data request from an optical head end;
determining, by the optical terminal based on received uplink grant information of the periodic data from the optical head end, a corresponding transmission slot for sending the periodic data, wherein the uplink grant information of the periodic data is continuously valid within a threshold time range; and
sending, by the optical terminal, the periodic data to the optical head end based on the transmission slot corresponding to the periodic data.

9. The method according to claim 8, wherein the uplink grant information of the periodic data is continuously valid within the threshold time range by being continuously valid before the optical head end reconfigures the uplink grant information of the periodic data.

10. The method according to claim 8, wherein the uplink grant information of the periodic data is received by the optical terminal from the optical head end in a pre-configuration phase.

11. The method according to claim 8, wherein the uplink grant information of the periodic data is carried in an administration and maintenance message in a frame structure sent by the optical head end to the optical terminal.

12. The method according to claim 11, wherein:
the uplink grant information of the periodic data is carried in a PLOAMd message in the frame structure sent by the optical head end to the optical terminal, and the PLOAMd message comprises a correspondence between an optical terminal identifier and a periodic data transmission slot; or
the uplink grant information of the periodic data is carried in an OMCI message in the frame structure sent by the optical head end to the optical terminal, and the OMCI message comprises the correspondence between the optical terminal identifier and the periodic data transmission slot.

13. The method according to claim 8, wherein the method further comprises:
receiving, by the optical terminal, an aperiodic data request and uplink grant information of aperiodic data from the optical head end, wherein the uplink grant information of the aperiodic data indicates a corresponding transmission slot of sending the aperiodic data by the optical terminal; and
sending, by the optical terminal, the aperiodic data to the optical head end based on the transmission slot corresponding to the aperiodic data.

14. The method according to claim 13, wherein the transmission slot corresponding to the aperiodic data is a remaining slot other than the transmission slot corresponding to the periodic data.

15. The method according to claim 8, wherein the uplink grant information of the periodic data comprises:
at least one information group, wherein each optical terminal of a plurality of optical terminals corresponds to at least one information group, and each information group comprises an allocation number, a start time, and a grant size.

16. An optical head end, comprising:
a transceiver;
one or more processors coupled to the transceiver; and
a memory with instructions stored thereon, wherein the instructions, when executed by the one or more processors, enable the one or more processors to:
generate uplink grant information of periodic data based on configuration information of the periodic data from a controller, wherein the uplink grant information of the periodic data indicates a corresponding transmission slot of sending the periodic data by an optical terminal, and the uplink grant information of the periodic data is continuously valid within a threshold time range; and send the uplink grant information of the periodic data to the optical terminal in a pre-configuration phase.

17. The optical head end according to claim 16, wherein the uplink grant information of the periodic data is configured to be continuously valid within the threshold time range by being continuously valid before the optical head end reconfigures the uplink grant information of the periodic data.

18. The optical head end according to claim 16, wherein the uplink grant information of the periodic data is configured to be carried in an administration and maintenance message in a frame structure sent by the optical head end to the optical terminal.

19. The optical head end according to claim 18, wherein:

the uplink grant information of the periodic data is carried in a physical layer operations, administration and maintenance downstream PLOAMd message in the frame structure sent by the optical head end to the optical terminal, and the PLOAMd message comprises a correspondence between an optical terminal identifier and a periodic data transmission slot; or the uplink grant information of the periodic data is carried in an ONT management and control interface OMCI message in the frame structure sent by the optical head end to the optical terminal, and the OMCI message comprises the correspondence between the optical terminal identifier and the periodic data transmission slot.

20. An optical terminal, comprising:

a transceiver;

one or more processors coupled to the transceiver; and a memory with instructions stored thereon, wherein the instructions, when executed by the one or more processors, enable the one or more processors to:

collect periodic data corresponding to a secondary station after receiving a periodic data request from an optical head end;

determine, based on received uplink grant information of the periodic data from the optical head end, a corresponding transmission slot of sending the periodic data, wherein the uplink grant information of the periodic data is continuously valid within a threshold time range; and send the periodic data to the optical head end based on the transmission slot corresponding to the periodic data.

* * * * *